United States Patent [19]

Onizawa

[11] 4,082,700

[45] Apr. 4, 1978

[54] VULCANIZABLE RUBBER COMPOSITIONS AND VULCANIZED RUBBERS OBTAINED THEREFROM

[75] Inventor: Masao Onizawa, Kunitachi, Japan

[73] Assignee: Sanyo Trading Co., Ltd., Tokyo, Japan

[21] Appl. No.: 625,106

[22] Filed: Oct. 23, 1975

[30] Foreign Application Priority Data

Oct. 29, 1974 Japan .................................. 49-124032

[51] Int. Cl.$^2$ ........................ C08G 65/32; C08J 3/24; C08K 5/09

[52] U.S. Cl. .................................. 260/2 A; 260/78 A; 526/11.2; 260/77.5 C

[58] Field of Search ........................ 260/2 A, 78 A; 526/11.2

[56] References Cited

U.S. PATENT DOCUMENTS

| 3,448,063 | 6/1969 | Breslow | 260/2 |
|---|---|---|---|
| 3,787,376 | 1/1974 | Nakamura et al. | 260/79 |
| 3,790,506 | 2/1974 | Tillson | 260/2 A |
| 3,876,590 | 4/1975 | Shimogawa et al. | 260/79 |

Primary Examiner—Harold D. Anderson
Assistant Examiner—E. A. Nielsen
Attorney, Agent, or Firm—Wenderoth, Lind & Ponack

[57] ABSTRACT

A vulcanizable composition which comprises epichlorohydrin rubber and at least one amino acid selected from the group consisting of arginine, lysine, hydroxylysine, ornithine, asparagine, glutamine and citrulline.

2 Claims, 6 Drawing Figures

VULCANIZABLE RUBBER COMPOSITIONS AND VULCANIZED RUBBERS OBTAINED THEREFROM

FIELD OF THE INVENTION

This invention relates to vulcanizable compositions comprising epichlorohydrin rubber and a novel amino acid vulcanizing agent, and also to the vulcanized rubbers prepared therefrom.

BACKGROUND OF THE INVENTION

Epichlorohydrin rubbers are noted for their excellent oil resistance, combustion resistance and heat resistance. The most typical of the epichlorohydrin rubbers are the homopolymers of epichlorohydrin (CHR), copolymers of epichlorohydrin and ethylene oxide (CHC), and binary and ternary copolymers formed by modifying CHR and CHC with allylglycidyl ether. As the vulcanizing agent for epichlorohydrin rubbers, 2-mercaptoimidazoline, diethylthiourea, dibutylthiourea, hexamethylenediamine carbamate, etc. are known, but there is a known defect in the vulcanization of epichlorohydrin rubber using those known vulcanizing agents, in that the mold is heavily stained. In order to avoid the mold staining, an acid acceptor such as red lead, zinc flower or magnesium oxide must be concurrently used. However, use of such an acid acceptor, which is injurious to human health, is undesirable because it is eluted during use of the final rubber product. Therefore, the rubber product cannot be used in the fields of medicines and foods, for example, as bottles and stoppers. Particularly when red lead is used, the epichlorohydrin rubber, after the vulcanization, exhibits excellent physical properties, but the toxicity of the lead compound presents a serious problem during the fabrication of said rubber.

We have found that a specific group of amino acids possess excellent vulcanizing effect on epichlorohydrin rubber, and furthermore that quite unexpectedly the amino acid causes no mold staining even when used without an acid acceptor. The present invention has been completed on the basis of these findings.

SUMMARY OF THE INVENTION

According to the invention, vulcanizable compositions comprising epichlorohydrin rubber and at least one amino acid selected from the group consisting of arginine, lysine, hydroxylysine, ornithine, asparagine, glutamine and citrulline are provided. Furthermore, the invention also provides the vulcanized rubbers obtained by vulcanizing said compositions.

DETAILED DESCRIPTION OF THE INVENTION

Figure 1:
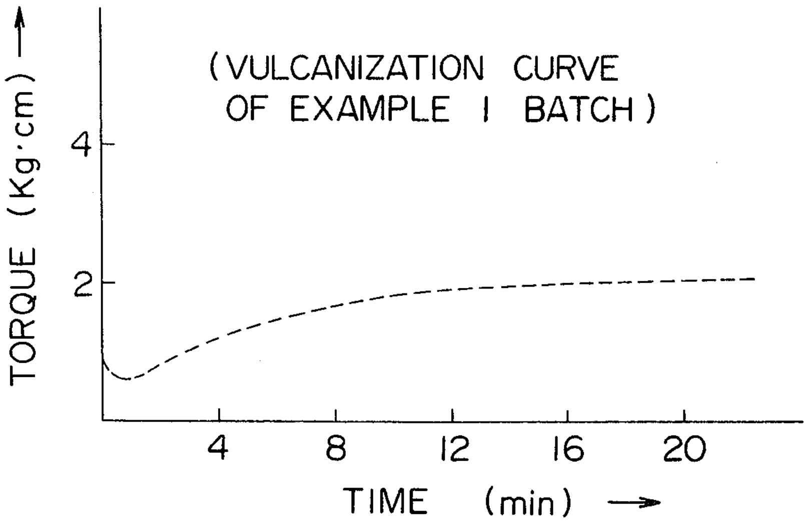
FIGS. 1 through 5 show the vulcanization curves demonstrating that the compositions of this invention are vulcanizable.

It is heretofore entirely unknown that the specific amino acids named in this invention possess excellent vulcanizing effect on epichlorohydrin rubber.

The epichlorohydrin rubber to be used in the composition of this invention covers the aforesaid CHR, CHC, and the binary and ternary copolymers formed by modifying CHR and CHC with allyglycidyl ether. These epichlorohydrin rubbers are known per se.

The utilization of the amino acids specified in this invention as the vulcanizing agent for the epichlorohydrin rubber produces various advantages as follows. The amino acid vulcanizing agent is free from mold staining even in the absence of acid acceptor, and consequently eliminates the possibility of eventual elution of the acid acceptor which is injurious to human health. If it should happen that the amino acid vulcanizing agent is eluted from the final rubber product, it presents no problem since the amino acid is entirely harmless. As the second advantage, the amino acid vulcanizing agent never causes the phenomenon of reversion which inevitably occurs more or less when conventional vulcanizing agents are used, to render the operational control of the vulcanization difficult. Furthermore, when vulcanized by the amino acid, the vulcanized rubber is imparted with improved physical properties such as tensile strength and permanent compression set.

The vulcanization of epichlorohydrin rubber using the specified amino acid or acids of the invention can be performed under the temperature and pressure conditions employed in the conventional vulcanization procedure. The ratio of the amino acid or acids to be used as the vulcanizing agent is suitably 0.01 to 50 parts by weight, preferably 0.1 to 10 parts by weight, per 100 parts by weight of the epichlorohydrin rubber.

The mechanism of vulcanizing action of the amino acid on epichlorohydrin rubber is not yet entirely clear, but it is essential that the amino acid or acids specified in this invention are used. As demonstrated in the later given Control, another amino acid, cystine, cannot vulcanize epichlorohydrin rubber.

The vulcanizable composition of the present invention may contain, other than the epichlorohydrin rubber and the amino acid vulcanizing agent, any of the conventionally employed additives such as a reinforcing agent, processing aid, pigment, softening agent, plasticizer and the like. Furthermore, if desired, the composition may be incorporated with a vulcanization-accelerator, acid acceptor and vulcanization-activator.

Further, vulcanized epichlorohydrin rubbers obtained by vulcanizing the compositions of this invention possess utility in various fields, such as for use in industrial goods, including tubes for automobile tires as well as for bicycle tires, inner liners for tubeless tires of automobiles, oil seals, rubber-coated fabrics and gaskets; and various medical supplies and appliances, such as bottles and stoppers. The rubber is particularly suited to usages requiring oil and combustion resistances, heat resistance and low gas-permeability.

Hereinafter the invention will be explained with reference to the working Examples, in which the parts are by weight unless otherwise specified. The testings mentioned in the Examples were performed as follows:

Tensile strength, Elongation at break and Modulus:

For the measurements of all these properties JISK-6301 test methods were followed, using a Schopper type tensile strength tester with a pull rate of 500 mm/min.

Hardness:

The test method specified in JISK-6301 was applied, using a JIS-A type hardness tester.

Vulcanization curve:

The curves were drawn using a JSR-model Curastometer.

EXAMPLE 1

A vulcanizable batch consisting of the components below was formed and vulcanized.

| | | |
|---|---|---|
| Epichlorohydrin rubber (CHC)(1) | 100 | parts |
| SRF carbon black(2) | 20 | parts |
| TE-58A(3) | 3 | parts |
| 50% Aqueous lysine solution | 3 | parts |

(1)DAISO-CHC (registered trademark) manufactured by Osaka Soda K.K.
Notes:
(2)semi-reinforcing furnace carbon black employed as a reinforcing agent.
(3)an alkali metal salt of a higher fatty acid manufactured by Technical Processing Co., U.S.A., used as processing aid for mill mixing.

The formulation and vulcanization of the batch were performed as follows: the epichlorohydrin rubber was wound in a band form on 8-inch open rolls disposed at an interspace of 1.4 mm, and the surface temperature of the rolls was maintained at 40±5° C. When the rubber surfaces became even, carbon black was added in a fixed quantity at various times, with occasional adjustment of the interspace of the rolls to keep the bank constant. After the addition of carbon black was completed, the mixture of TE-58A and 50% aqueous lysine solution was added. Then the batch was subjected to three ¾ cuts each way, and cut from the rolls and rolled. The interspace of the rolls was decreased to 0.7 mm, and the rolled stock was passed endwise through the rolls' interspace six times. The batch was sheeted off and aged for a day and night. After the aging, the batch was passed endwise through the rolls' interspace six times, using the open rolls employed for the blending operation of which the surface temperature was maintained at 40±5° C. and the interspace was 1.4 mm. The batch was subjected to three ¾ cuts each way as wound in a band form on the rolls as it was, sheeted and vulcanized for 20 minutes with an electrothermal press of 170° C. Also the vulcanization curve of the composition was drawn, using a JSR-model curastometer of 160° C.

The physical properties of thus obtained vulcanized rubber were as shown in Table 1 below, and the vulcanization curve, in FIG. 1.

Table 1

| | |
|---|---|
| Tensile strength (Kg/cm$^2$) | 147 |
| Elongation at break (%) | 1060 |
| Hardness | 44 |
| 300% Modulus (Kg/cm$^2$) | 37 |

From the results of the experiment as shown in Table 1 and FIG. 1, it can be understood that the epichlorohydrin rubber can be vulcanized by lysine, with no reversion occurring. No mold staining was observed during the vulcanization, although no acid acceptor was used in the above run.

EXAMPLE 2

A vulcanizable batch composed of the following ingredients was prepared by the method described below, and vulcanized.

| | | |
|---|---|---|
| Epichlorohydrin rubber (CHC)(1) | 100 | parts |
| SRF carbon black(2) | 20 | parts |
| TE-58A(3) | 1 | parts |
| Arginine | 1.8 | parts |
| 50% aqueous lysine solution | 1.2 | parts |

Notes:
(1), (2) and (3)are identical with those specified in Example 1.

The epichlorohydrin rubber was wound on 8-inch open rolls interspaced by 1.7 mm, and the surface temperature of the rolls was maintained at 40±5° C. throughout the operation. When the rubber surfaces became even, carbon black was added in a fixed quantity at various times, care being taken to maintain the surface evenness, with occasional adjustment of the interspace of the rolls to keep the bank constant. After all of the carbon black was added, TE-58A was incorporated, followed by one ¾ cut each way, and subsequent addition of the mixture of arginine and 50% aqueous lysine solution. The procedures exactly identical to those followed after the addition of vulcanizing agent as described in Example 1 were repeated, and the vulcanization was performed with an electrothermal press of 170° C. for 20 minutes. A vulcanization curve was drawn also as to this batch by the method employed in Example 1. No staining of the mold was observed in this vulcanization experiment.

Figure 2:
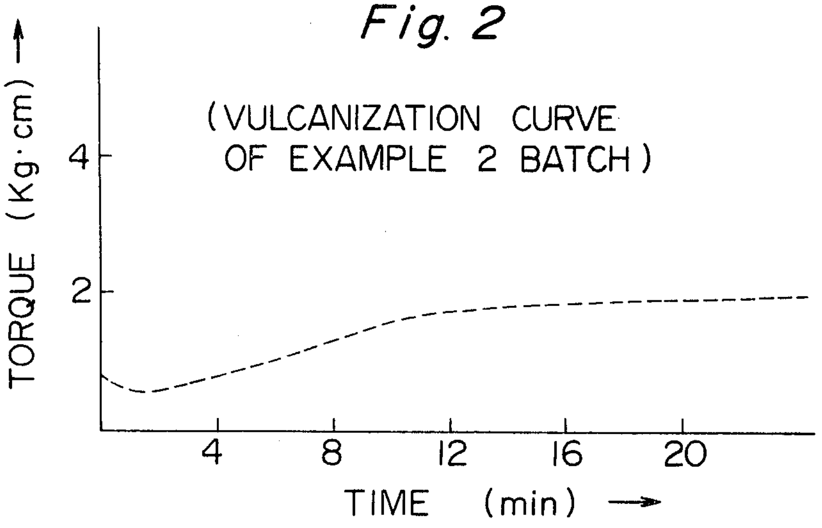

The physical properties of the vulcanized rubber were as shown in Table 2, and the vulcanization curve, in FIG. 2.

Table 2

| | |
|---|---|
| Tensile strength (Kg/cm$^2$) | 169 |
| Elongation at break (%) | 940 |
| Hardness | 46 |
| 300% Modulus (Kg/cm$^2$) | 39 |

EXAMPLE 3

A vulcanizable batch was prepared from the following components:

| | | |
|---|---|---|
| Epichlorohydrin rubber (CHC)(1) | 100 | parts |
| SRF-L carbon black(2) | 20 | parts |
| TE-80(3) | 3 | parts |
| Arginine | 3 | parts |

(1)same epichlorohydrin rubber as that used in Example 1.
Notes
(2)a semi-reinforcing furnace low-structure carbon black used as a reinforcing agent.
(3)an alkali metal salt of a higher fatty acid manufactured by Technical Processing Co., U.S.A., added to improve the mill mixing.

The formulation of the batch was performed under conditions identical to those of Example 1, except that the mixture of TE-58A and 50% aqueous lysine solution was replaced by the mixture of above TE-80 and arginine.

Thus obtained batch was vulcanized for 15 minutes with an electrothermal press of 170° C. Also the vulcanization curve was drawn at 170° C., similarly to Example 1. No mold staining was observed in the vulcanization experiment.

Figure 3:
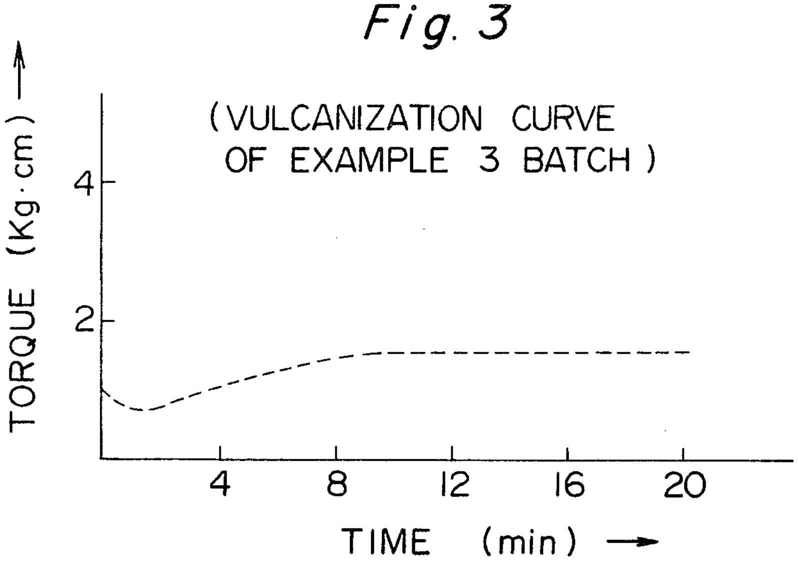

The physical properties of the vulcanized rubber and the vulcanization curve were as shown respectively in Table 3 and FIG. 3.

Table 3

| | |
|---|---|
| Tensile strength (Kg/cm$^2$) | 29 |
| Elongation at break (%) | 990 |
| Hardness | 31 |
| 300% modulus (Kg/cm$^2$) | 5 |

EXAMPLE 4

A vulcanizable batch was prepared from the following components:

| | | |
|---|---|---|
| Epichlorohydrin rubber (CHC)(1) | 100 | parts |
| SRF-L carbon black(2) | 20 | parts |
| TE-58A(3) | 3 | parts |

-continued

| | |
|---|---|
| 50% Aqueous ornithine solution | 3 parts |

Notes:
(1) and (3) are identical with those used in Example 1, and (2) with that of Example 3.

The formulation procedures and the vulcanization were performed under conditions identical to those of Example 3.

No mold staining was observed in the vulcanization.

The physical properties of the resulting vulcanized rubber are shown in Table 4 below:

Table 4

| | |
|---|---|
| Tensile strength (Kg/cm²) | 36 |
| Elongation at break (%) | 1040 |
| Hardness | 30 |
| 300% Modulus (Kg/cm²) | 6 |

A vulcanization curve was drawn as to the formulated batch similarly to Example 3, which was similar to the curve shown in FIG. 3.

EXAMPLE 5

A vulcanizable batch was formulated from the following components:

| | |
|---|---|
| Epichlorohydrin rubber (CHC)(1) | 100 parts |
| FEF- carbon black(2) | 20 parts |
| TE-58A(3) | 2 parts |
| Glutamine | 3 parts |

Notes:
(1) and (3) are the same as those of Example 1, and
(2) is a first extrusion furnace carbon black, added as a reinforcing agent.

The formulating procedures were identical to those of Example 3. The formed batch was vulcanized for 30 minutes with a 170° C. electrothermal press. No mold staining was observed in the vulcanization.

The physical properties of the vulcanized rubber were as shown in Table 5.

Table 5

| | |
|---|---|
| Tensile strength (Kg/cm²) | 128 |
| Elongation at break (%) | 1070 |
| Hardness | 38 |
| 300% Modulus (Kg/cm²) | 19 |

EXAMPLE 6

A vulcanizable batch was formulated from the following components:

| | | |
|---|---|---|
| Epichlorohydrin rubber (CHR)(1) | 100 | parts |
| SRF carbon black(2) | 40 | parts |
| TE-58A(3) | 1.5 | parts |
| Arginine | 1.75 | parts |
| 50% Aqueous lysine solution | 1.25 | parts |

Notes:
(1) Hydrin 100 (registered trademark) manufactured by B.F. Goodrich Chemicals, Co.
(2) and (3) are identical with those of Example 1.

Figure 4:
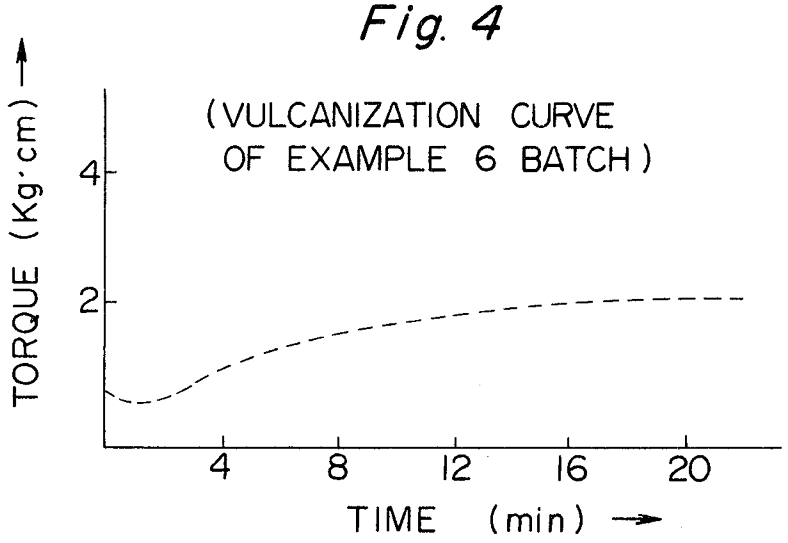

The formulation procedures were the same as those described in Example 2, and the formed batch was vulcanized. The physical properties of the vulcanized rubber obtained by 15 minutes' vulcanization with a 170° C. electrothermal press were as shown in Table 6, and the vulcanization curve at 170° C., as shown in FIG. 4.

Table 6

| | |
|---|---|
| Tensile strength (Kg/cm²) | 79 |
| Elongation at break (%) | 590 |
| Hardness | 68 |
| 300% Modulus (Kg/cm²) | 55 |

EXAMPLE 7

A vulcanizable batch was formulated by the method similar to that of Example 2, using the following components:

| | | |
|---|---|---|
| Epichlorohydrin rubber(1) | 100 | parts |
| SRF carbon black(2) | 40 | parts |
| TE-58A(3) | 1.5 | parts |
| Arginine | 1.75 | parts |
| 50% Aqueous lysine solution | 1.25 | parts |

Notes:
(1) Zechlone-1100 (registered trademark) manufactured by Nippon Zeon K.K., and epichlorohydrin rubber of binary copolymer formed by modifying CHR with allylglycidyl ether.
(2) and (3) are the same as those specifiedin Example 1.

Figure 5:
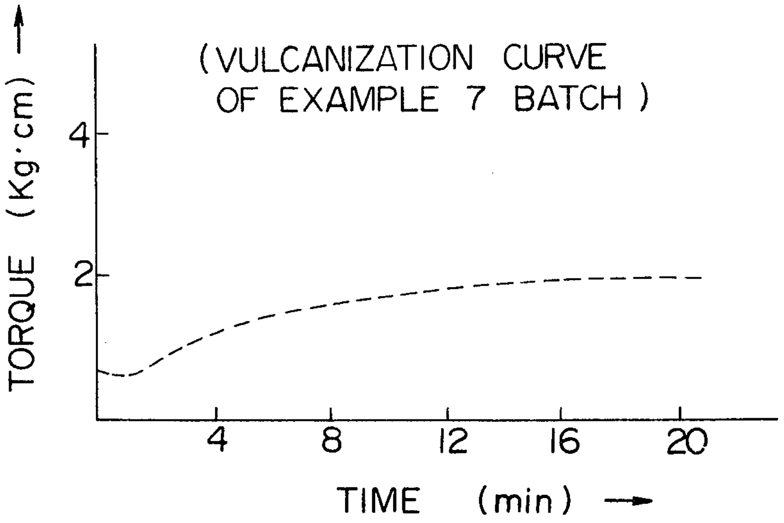

The physical properties of the vulcanized rubber obtained by vulcanizing the above batch for 15 minutes with a 170° C. electrothermal press were as shown in Table 7, and the vulcanization curve at 170° C. was as shown in FIG. 5.

Table 7

| | |
|---|---|
| Tensile strength (Kg/cm²) | 131 |
| Elongation at break (%) | 540 |
| Hardness | 69 |
| 300% Modulus (Kg/cm²) | 87 |

CONTROL

Figure 6:
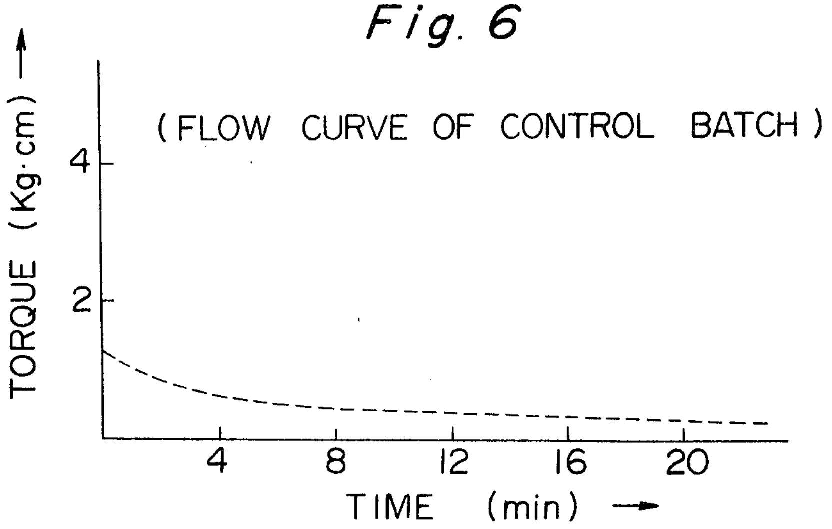
FIG. 6 is a flow curve showing that a composition deviating from that specified in this invention is not vulcanizable.

A rubber blend was prepared under conditions identical to those of Example 1, except that the 3 parts of 50% aqueous solution of lysine was replaced by 3 parts of cystine, an amino acid outside the specified group of this invention. The batch was heated for 20 minutes with a 170° C. electrothermal press, but the obtained rubber was extremely weak, and readily broken when lightly pulled by hand. This indicates that the above heat treatment failed to give a rubbery elastomer. It is apparent therefore, that no vulcanization took place. This fact was confirmed also by drawing a flow curve by applying the JSR-model curastometer of 170° C. to the same batch. The flow curve was as shown in FIG. 6, clearly showing that the epichlorohydrin rubber cannot be vulcanized at all when cystine is used.

I claim:

1. A vulcanizable composition which comprises (1) an epichlorohydrin rubber selected from the group consisting of an epichlorohydrin homopolymer, a copolymer of epichlorohydrin and ethylene oxide, a copolymer of epichlorohydrin and allylglycidyl ether, and a copolymer of epichlorohydrin, ethylene oxide and allylglycidyl ether, and (2) 0.01 to 50 parts by weight per 100 parts by weight of the epichlorohydrin rubber of at least one amino acid selected from the group consisting of arginine, lysine, hydroxylysine, ornithine, asparagine, glutamine and citrulline.

2. A vulcanized rubber obtained by vulcanizing the composition of claim 1.

* * * * *